United States Patent
Nath et al.

(10) Patent No.: US 8,311,042 B2
(45) Date of Patent: Nov. 13, 2012

(54) SYSTEM AND METHOD FOR AUTOMATIC DETECTION AND REPORTING OF THE MAPPING BETWEEN DEVICE IDENTITY AND NETWORK ADDRESS IN WIRELESS NETWORKS

(75) Inventors: Badri Nath, Edison, NJ (US); Rakesh Kushwaha, Marlboro, NJ (US)

(73) Assignee: Mformation, Edison, NJ (US)

( * ) Notice: Subject to any disclaimer, the term of this patent is extended or adjusted under 35 U.S.C. 154(b) by 697 days.

(21) Appl. No.: 11/763,738

(22) Filed: Jun. 15, 2007

(65) Prior Publication Data

US 2008/0310425 A1 Dec. 18, 2008

(51) Int. Cl.
*H04L 12/28* (2006.01)
(52) U.S. Cl. ............... 370/395.3; 370/395.31; 709/204; 709/230; 709/245; 709/242; 455/414.1; 455/411
(58) Field of Classification Search .............. 370/328, 370/395.1–395.5, 331, 338, 254, 204, 230; 709/204, 230, 242, 245; 455/411, 414.1
See application file for complete search history.

(56) References Cited

U.S. PATENT DOCUMENTS

| | | | |
|---|---|---|---|
| 6,069,877 A | 5/2000 | Yang | |
| 6,317,594 B1 | 11/2001 | Gossman et al. | |
| 6,580,372 B1 | 6/2003 | Harris | |
| 6,776,334 B1 | 8/2004 | Garg | |
| 6,813,498 B1 | 11/2004 | Durga et al. | |
| 7,024,177 B2 * | 4/2006 | Bhasin et al. | 455/411 |
| 7,492,787 B2 * | 2/2009 | Ji et al. | 370/466 |
| 2002/0003780 A1 * | 1/2002 | Braun et al. | 370/254 |
| 2003/0028671 A1 * | 2/2003 | Mehta et al. | 709/245 |
| 2003/0051146 A1 * | 3/2003 | Ebina et al. | 713/185 |
| 2003/0186680 A1 * | 10/2003 | Bhasin et al. | 455/411 |
| 2004/0213260 A1 * | 10/2004 | Leung et al. | 370/395.3 |
| 2004/0249887 A1 * | 12/2004 | Garcia-Martin et al. | 709/204 |
| 2008/0310425 A1 * | 12/2008 | Nath et al. | 370/395.54 |
| 2008/0320165 A1 * | 12/2008 | Jeon et al. | 709/242 |

FOREIGN PATENT DOCUMENTS

EP 1263171 A1 12/2002

(Continued)

OTHER PUBLICATIONS

S. Alexander, RFC 1533—DHCP Options and BOOTP Vendor Extensions, Oct. 1993, XP-015007320.
European Patent Office as International Searching Authority, International Search Report and Written Opinion of the International Searching Authority, PCT/US2008/059993, Jul. 24, 2008.
Response to Written Opinion of the IPEA, PCT/US2008/059993, Apr. 14, 2009.

*Primary Examiner* — Jinsong Hu
*Assistant Examiner* — Nathan Taylor
(74) *Attorney, Agent, or Firm* — Brosemer, Kolefas & Associates, LLC

(57) ABSTRACT

A method and system for communicating the identity of devices detected in a wireless communication system. The devices connect to a mobile wireless network comprising a wireless access network and a core Internet Protocol (IP) network. The identities of devices so detected are specified by a combination of device and network-level identities and is communicated to a management server. In an exemplary embodiment, network elements of the core IP network are used to detect and convey the identity of wireless devices to a management server.

18 Claims, 9 Drawing Sheets

FOREIGN PATENT DOCUMENTS

| | | |
|---|---|---|
| EP | 1578068 A1 | 9/2005 |
| EP | 1718033 A1 | 2/2006 |
| EP | 1791293 A1 | 5/2007 |
| GB | 2418321 A | 3/2006 |
| WO | 2004/019592 A1 | 3/2004 |
| WO | 2007/098152 A1 | 11/2004 |

* cited by examiner

SYSTEM AND METHOD FOR AUTOMATIC DETECTION AND REPORTING OF THE MAPPING BETWEEN DEVICE IDENTITY AND NETWORK ADDRESS IN WIRELESS NETWORKS

FIELD OF THE INVENTION

The present invention relates to the field of wireless communication networks, and in particular to tracking the identities and network addresses of devices operating in such networks.

TERMINOLOGY

The present application contains several acronyms or abbreviations for various elements of wireless network communication systems. The following listing of terminology is provided for convenience.
  2G: second generation wireless network
  3G: third generation wireless network
  4G: fourth generation wireless network
  AAA: Authentication, Authorization, and Accounting
  CDMA: Code division multiple access
  CSCF: Call State Control Function
  DHCP: Dynamic Host Configuration Protocol
  ESN: Electronic Serial Number
  FA: foreign Agent
  GSM: Global System for mobile communications
  HA: Home Agent
  HSS: Home Subscriber Server
  IMEI: International mobile Equipment Identity
  IMSI: International mobile Subscriber Identity
  MAC: Media Access Control
  MEID: Mobile Equipment IDentifier
  MGMT server: Device management server
  MSISDN: Mobile Station Integrated Services Digital Network
  SIP: Session Initiation Protocol
  SKU: Stock Unit number
  SMS: Small Message Service
  URL: Universal Resource Locator
  WiMAX: Worldwide interoperability for Microwave Access

BACKGROUND INFORMATION

Remote management of wireless devices is an essential aspect of offering enhanced services, such as multimedia services, in a wireless network. In order to remotely send management commands over the air to a wireless device, a device management server needs to know the identity of the device, whether the device is present on the network, and if so, where on the network the device can be found.

The basic network architecture of mobile wireless systems has evolved, resulting in several generations of wireless networks, including the current cellular systems exemplified by 2G and 3G networks. In 2G and 3G systems, the elements of the core network have a signaling interface that is based on IS-41 (using SS7 transport) and not on Internet Protocol (IP). However, this is beginning to change as some of the current and future deployments are beginning to support Internet Protocols in the core network (IMS-IP multimedia subsystems and 4G networks).

The core networks of the next generation of wireless communication systems will support IP, with the network elements supporting interfaces and functions found in the Internet. In such a system, wireless devices connect to the core network via wireless access points. To communicate on such a network, wireless communication devices will need to have IP addresses, and external hosts, such as device management servers, will need to know the IP addresses of the wireless devices in order to communicate with them. Furthermore, for devices with multiple interfaces, it will also be necessary to know the IP address for each interface along with the identity of the device.

In existing wireless networks, the presence of a device in the wireless network is detected by detecting wireless activity. Wireless activity indicates the presence of a device in the network but does not provide any information about the identity or a change in identity of the device. For example, the IP address of a device can expire or can be reassigned. In such a case, detection of activity in the wireless network alone is not sufficient for the device management server, which needs to know the current routable identity of the device such as the IP address of the device.

Furthermore, because the routable identity of the device such as the IP address or the network address may change, detecting the presence of a wireless device at the time of registration by a wireless network element such as a base station, or a home location register (HLR), is also not sufficient. Hence, in networks that support IP in the core, such as IP multimedia subsystems (IMS), WiMAX, or 4G wireless networks, the conventional approaches of IP detection are not viable.

Presently, a device management server sends notifications to wireless devices using SMS messages. SMS messages are sent using a fixed identity of the device, such as the phone number assigned to the device or MSISDN.

Newer, converged wireless devices, however, support interfaces for a conventional wireless network, a local area wireless network, and/or an IP wireless network. Such devices have a different set of identities that are visible at the core network or can be retrieved from the device. Examples of such identities include ESN, MEID, Stock Keeping Unit (SKU), BIOS string, MAC address, and IP address. These identities are typically sought by external systems such as device management servers. Some of these identities, however, including network addresses such as IP addresses, are not permanent and may change as well.

With converged devices supporting both a cellular interface and an internet interface, there is a need to send server-initiated notifications over the internet interface using the IP address of the device. The mapping of the phone number or MSISDN to a device IMEI is known to the management server and changes infrequently. When the association of the phone number or MSISDN to a given device changes, however, the decision to change the phone number for a given device is not typically made by network elements but by administrative entities, or at the request of the customer; i.e., external to the network. In systems such as GSM, a phone number is associated with a SIM card and any change in the association of a SIM card and a device results in a change in the mapping between MSISDN and the device.

There are mechanisms to communicate such changes to external systems. Typically, the HLR serves as the informing entity as the subscriber database is maintained by the HLR.

Unlike a phone number or MSISDN in a conventional wireless network, the IP address associated with a wireless device, in networks that support IP addressing of wireless devices, is more dynamic and can change, for example, due to mobility or expiry of the lease time for a give network address. The mapping of network addresses and device identities is typically determined by core network elements, such as a Dynamic Host Configuration Protocol (DHCP) server, for example. Alternatively, the network address of a device may be determined locally, such as in the case of a link-local address. A link-local address is an IP address constructed locally by a mobile device based on the hardware MAC address. This address can be used for IP communication within a local network without having to contact a server for address assignment. The network address assigned to a mobile device can change when the mobile device moves or is reassigned.

A need therefore exists for a mechanism by which the network address of a mobile device can be made available reliably and timely to any network elements or external elements that need to know the network address of the mobile device.

SUMMARY OF THE INVENTION

The present invention relates to a method by which core network elements of a wireless communication system detect a wireless device and report the identity of the device to a device management server. In one aspect, the present invention provides a mechanism by which network elements that authenticate a wireless device or assign an IP address to a device inform a device management server of the IP address currently assigned to the wireless device or the IP address of a proxy to which the notifications are to be sent. In a further aspect, the present invention provides a mechanism for a wireless device that allocates a link-local address to inform a management server of the currently assigned link-local address.

In accordance with the present invention, the detection and reporting of wireless device identity is triggered not only when a device is detected but also when a change in identity is detected. This functionality is embedded in core network elements responsible for registration as well as assigning IP addresses to devices.

In an aspect of the present invention, the identity of a wireless device is communicated when the device registers with an authorization or authentication server (AAA server) for purposes of authentication. The identity includes the physical identity associated with the hardware of the device (e.g., ESN, MEID or IMEI) and the identity of the network interface over which an authorization request was sent, such as the MAC address.

In another aspect of the present invention, the identity of a wireless device is communicated when the device is assigned an IP address by a Dynamic Host Configuration Protocol (DHCP) server. The DHCP server obtains the device identity from the device during a request for an address assignment. In addition to the device identity and the assigned IP address, additional information that may be communicated includes, for example, the MAC address and the duration of the IP address assignment authorized for the device.

In yet another aspect of the present invention, the identity of a wireless device is communicated when the device is discovered by a network element such as a Foreign Agent or a Proxy-Call Session Control Function (CSCF). In addition to the device identity and the IP address assigned to the device, additional information that may be communicated includes, for example, the MAC address of the device and the duration of the IP address assignment authorized for the device.

In yet another aspect of the present invention, the identity of a wireless device is communicated by a Home Agent or Service-CSCF. In addition to the device identity and the IP address assigned to the device, additional information that may be communicated includes, for example, the MAC address of the device and the duration of the IP address assignment authorized for the device. The Home Agent or Service-CSCF preferably communicates any changes to the IP address assignment of the device. This may be needed when the network attachment point of the wireless device changes, resulting in the device connecting to a different network.

In yet another aspect of the present invention, the address of a management server serving a particular wireless device is stored in the wireless device and is sent by the device as an extension or in protocol option fields of standard protocol messages during a discovery, registration, authentication or address request. Given the management server's address, the network elements can then provide the management server with the desired information regarding the wireless device (e.g., identity, IP address, etc.).

In yet another aspect of the invention, the address of the management server is configured at the network elements of the core network. Whenever a device sends a message for purposes of registration, discovery, authentication or address request, the network element sends the desired identity information of the device to the management server.

The above and other aspects and features of the present invention will be apparent from the drawings and detailed description which follow.

DETAILED DESCRIPTION

Figure 1:
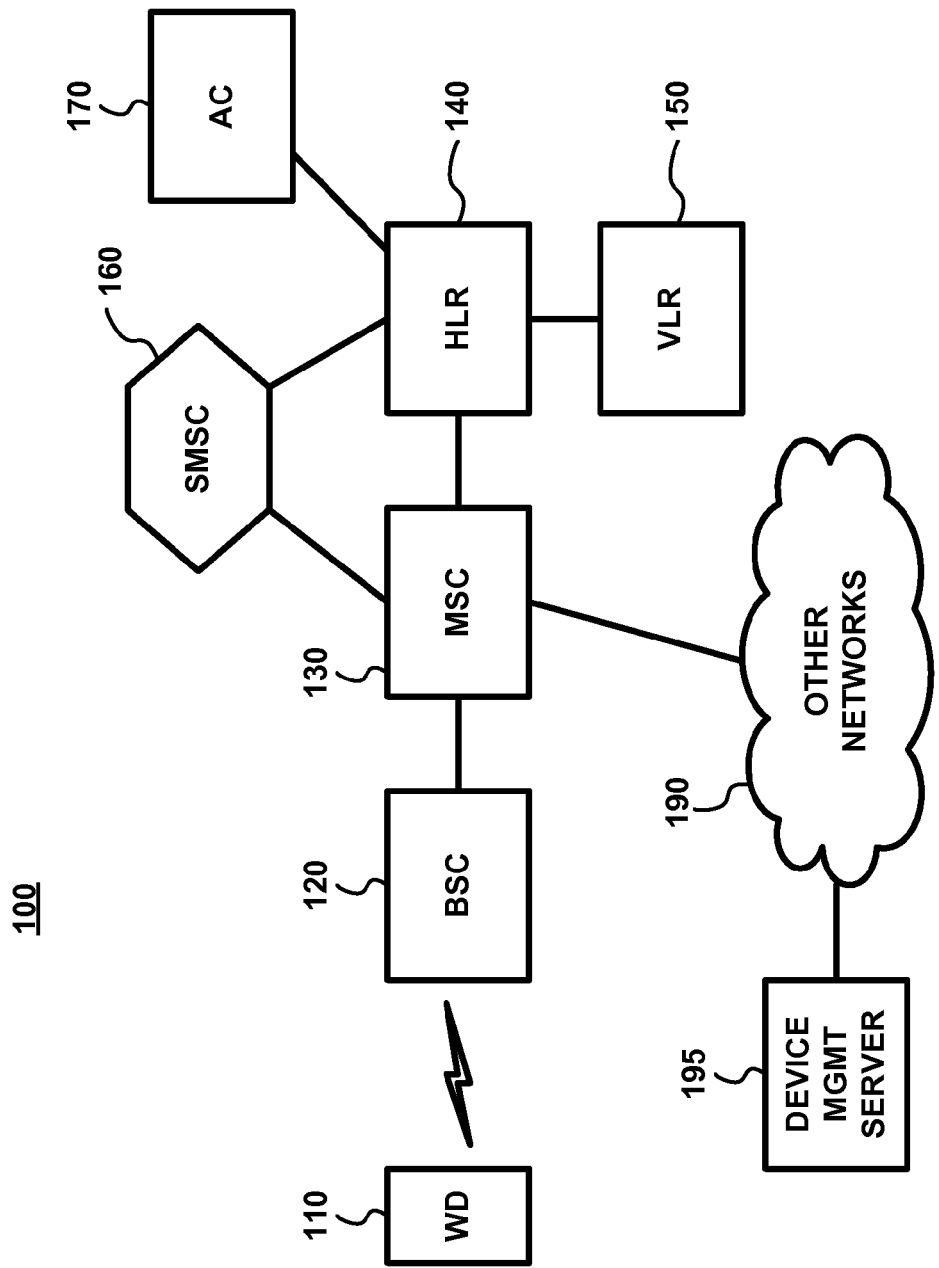
FIG. 1 is a block diagram showing the system architecture of a conventional second generation wireless network.

As shown in FIG. 1, the network architecture of a conventional wireless communication system 100, exemplified by GSM and CDMA systems, consists of a hierarchy of network elements. A wireless device 110 connects to a base station 120 which in turn connects to a Mobile Switching Center (MSC) 130 which connects to other networks 190. Device and subscriber information is maintained in a database that is accessed by the home location register (HLR) 140 and visiting location register (VLR) 150. The security keys required for authentication of the device and the user with respect to the network are maintained with a network element called the Authentication Center (AC) 170. The HLR 140 keeps track of the mapping between the mobile equipment identities and the phone numbers assigned to the mobile equipment. The signaling protocol among the various network elements is based on standards such as IS-41 and IS-95, which use SS7 transport.

To support Small Message Service (SMS), a SMS controller (SMSC) 160 is included in the system 100. Typically, a device management server 195 located in another network 190 sends notifications to wireless devices using SMS messages. SMS messages are sent to a wireless device using a known designation assigned to the device such as is typically used in a traditional mobile wireless network, such as a 10-digit telephone number, a Mobile Station Integrated Services Digital Network (MSISDN) number, or the like. Whenever a wireless device 110 is detected within the coverage area of the wireless communication system 100, the HLR 140 is informed of the device's current location and queried for authenticating the device to provide services. The HLR 140 knows the valid devices allowed on the network and can be configured to inform the management server 195 of any new device that registers on the network.

The device management server 195 knows the "identity" of each wireless device that it manages. The "identity" of a wireless device or "device identity" is typically a unique immutable string that is associated with each wireless device and is typically stored in each device. Examples of such identities include International Mobile Subscriber Identity (IMSI), Electronic Serial Number (ESN), Mobile Equipment Identity (MEID), International Mobile Equipment Identity (IMEI), or any other string used by a device manufacturer to uniquely identify the device. In addition to the HLR 140, the identities of wireless devices 110 in the system 100 are known and can be obtained from (or are "visible" at) wireless network elements such as the MSC 130 and the VLR 150. When a wireless device registers with a wireless network, the identity of the device can be communicated to a desired external system.

In addition to the identity (e.g., IMEI) of each wireless device that it manages, a device management server 195 may know the MSISDN for each such device. The MSIDN may be communicated by means of a configuration file or entered manually in a database or entered in the system when a new device gets added. Any changes in the mapping (e.g., between IMEI and MSISDN) are communicated by the HLR 140. The HLR should be configured with the address of the external entity to which the mapping change is to be communicated.

Figure 2:
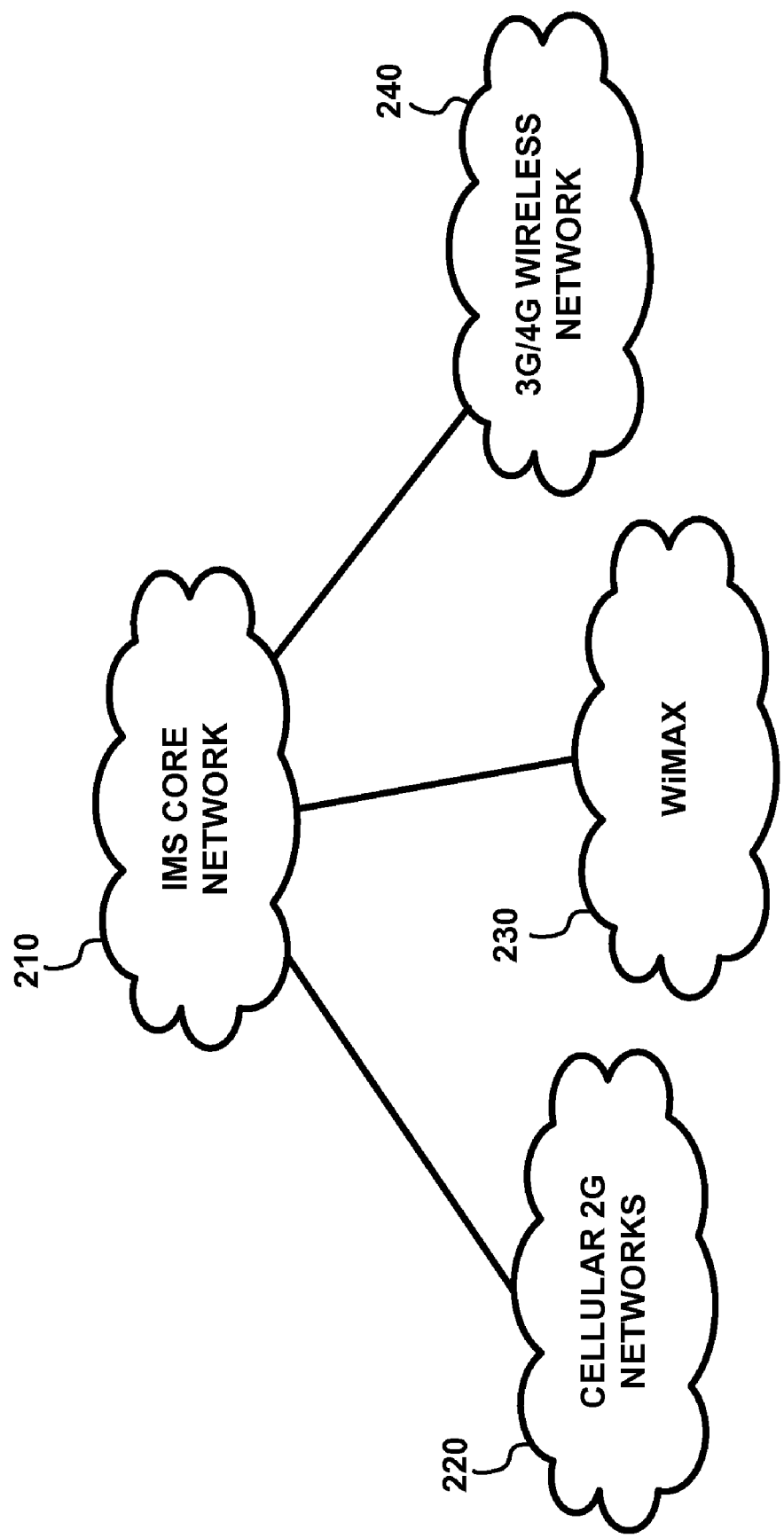
FIG. 2 schematically illustrates an IP multimedia subsystem (IMS) core network supporting other wireless network systems.

To support advanced multi-media services in a wireless communication system, a network architecture called the IP multimedia subsystem (IMS) was developed. As shown in FIG. 2, the IMS architecture includes an IMS core network 210 that supports Internet protocol (IP), and one or more radio access networks, such as, for example, a 2G cellular network 220, a WiMAX network 230, and/or a 3G/4G wireless network 240. The signaling functions in the core network are handled by Session Initiation Protocol (SIP) servers (not shown), also called Call State Control Function (CSCF) servers, which communicate using IP. The signaling and data traffic from the radio access network(s) 220-240 are relayed by various CSCF servers which are the first point of contact with the core network 210.

Figure 3:
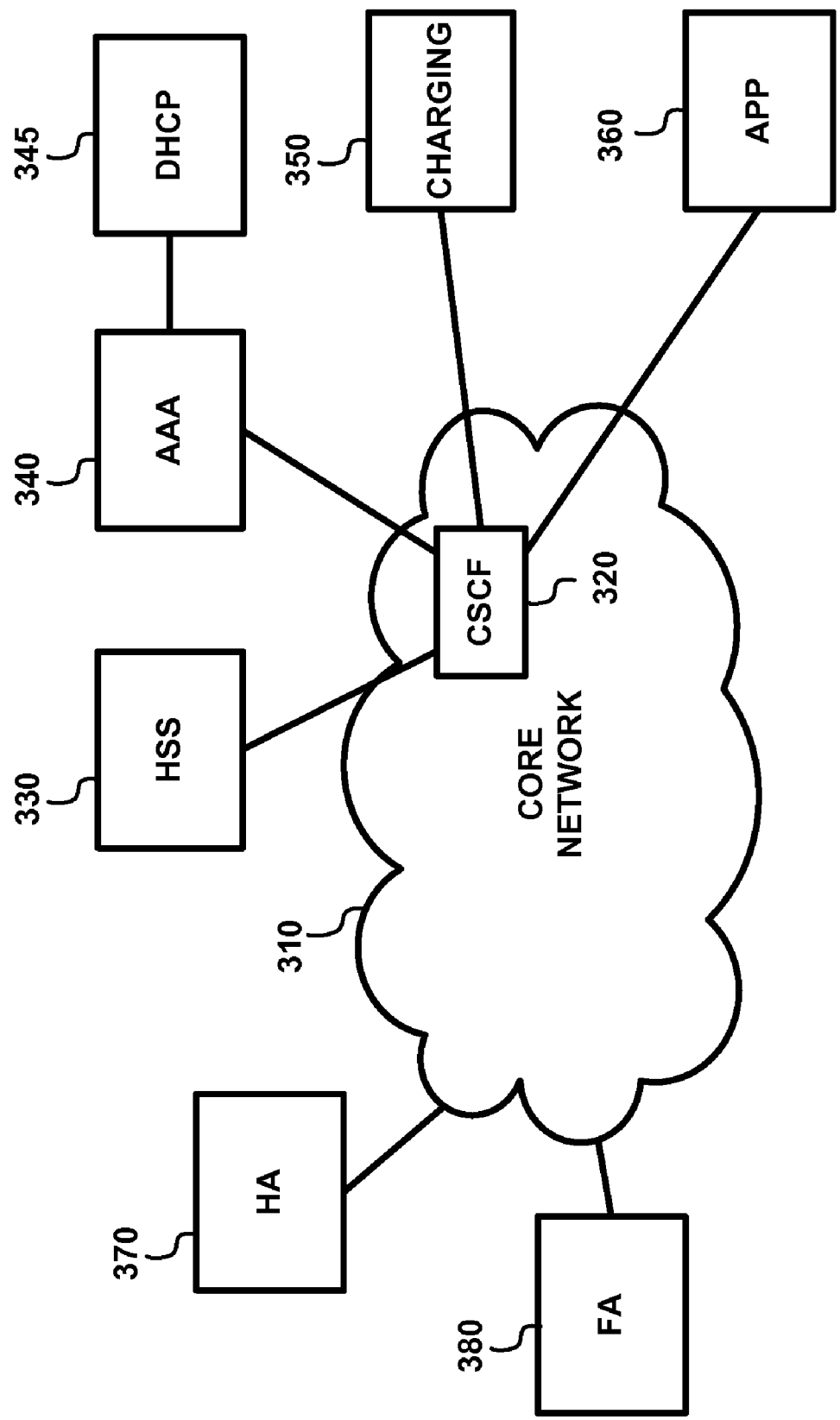
FIG. 3 schematically illustrates various network elements that are aware of the mapping of device identity and network address.

As illustrated in FIG. 3, a Home Subscriber Server (HSS) 330, an Authentication Authorization and Accounting (AAA) server (e.g., RADIUS, DIAMETER) 340, charging elements 350, and application servers 360 all interface to one or more CSCF servers 320 of the core network 310. The Home Subscriber Server (HSS) is the master user database that supports the IMS network entities that are actually handling the calls/sessions. The HSS contains subscription-related information (e.g., user profiles), performs authentication and authorization of users, and can provide information about the physical location of a user. The HSS is analogous to the HLR of a conventional cellular system. A Dynamic Host Configuration Protocol (DHCP) server 345 interfaces to the AAA server 340.

In addition, the core network elements (e.g., CSCF servers 320) interface with support elements such as home agents (HA) 370 and foreign agents (FA) 380 to support mobility using mobile-IP. A network address can be assigned to a wireless device by any of the core network elements as well as the support elements. In an exemplary embodiment of the present invention, a mechanism is provided by which such network elements can inform device management servers of the presence of any new device in the system or a new mapping of identities of devices already in the system.

In an exemplary embodiment, the present invention allows the communication of the mapping of (or "binding" between) the identity of a wireless device and the network address assigned to the wireless device, by using one or more of the various network elements that detect the presence of wireless devices, authorize wireless devices, and assign network addresses to wireless devices. As mentioned, the device identity is exemplified by a number stored in the device hardware, such as, for example, IMEI, MAC address, serial number or SKU that uniquely identifies the device hardware. The network address is the address associated with an interface of the device to which packets can be routed. In accordance with the present invention, any of the network elements with which a wireless device registers or which is responsible for assigning network addresses, can be adapted to communicate the mapping of device identity to network address for a wireless device to an external system, such as a device management server.

The detection and communication of the network address of a wireless device can be done whenever an interaction occurs between the device and a network element operating in accordance with the present invention. For example, when a DHCP server assigns an IP address to a wireless device and the device accepts the address, the DHCP server can inform the management server of the device identity and the assigned network address. Similarly, when a wireless device requests an authentication service from a AAA server, the AAA server can communicate the identity/address mapping of the device to the management server. These two cases are illustrative of how network elements, during any interaction with a wireless device, can detect the device and convey the mapping between the network address and the device identity.

Figure 4:
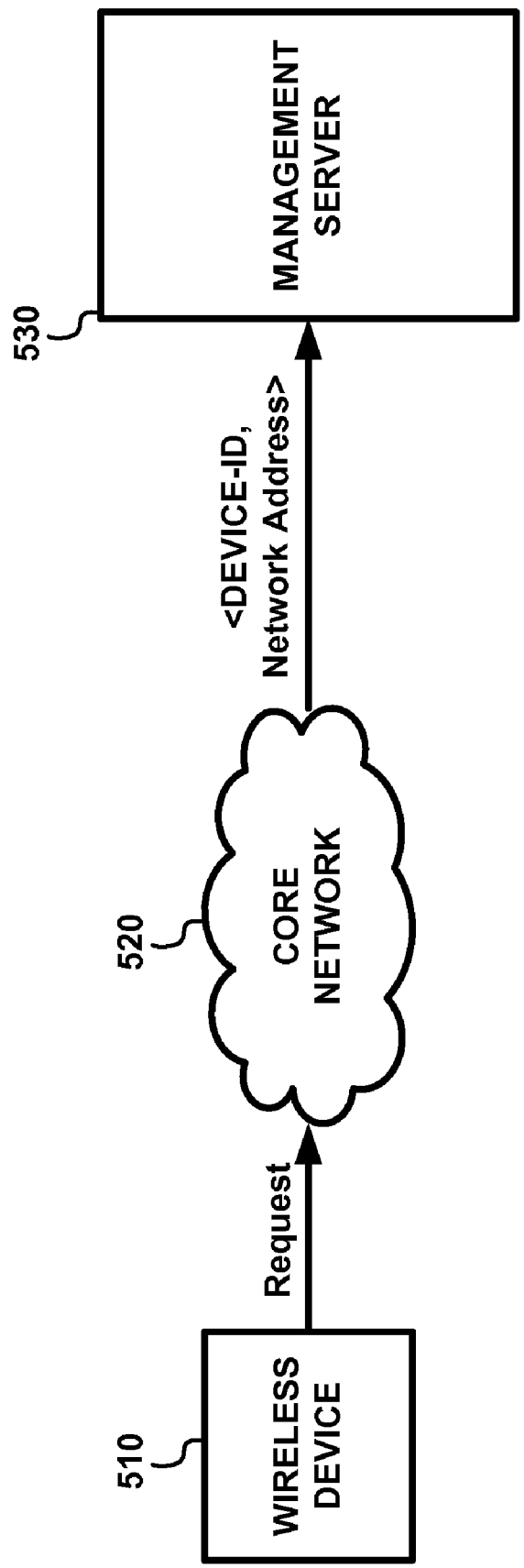
FIG. 4 depicts that any request generated by a wireless device can trigger a message from the core network that contains the mapping between the identity and the network address of the device.

FIG. 4 illustrates that any of a variety of requests from a wireless device 510 can trigger the generation of a mapping message from the core network 520 containing the mapping between the identity and the network address of the device. A request that may trigger such an event may include, for example, an address request, authorization request, session request, or provision request. The mapping message is sent by the core network 520 to a device management server 530 associated with the device 510. Exemplary arrangements for locating the server 530 are described below.

In a further aspect of the present invention, one or more elements of an IMS-enabled network, such as a DHCP server, CSCF, HA, FA, AAA server, or any other element adapted in accordance with the present invention, can detect a new binding or a change in an existing binding of a wireless device and communicate any changes detected to an external system such as a device management server. This includes the steps of intercepting any request for registering a device, authenticating a device, address assignment or session initiation; determining the existing mapping between the network address and the device identity; noticing any difference between the current mapping and the existing mapping; notifying the device management server of the new mapping of the network address and the device identity.

In a further exemplary embodiment, a wireless device itself may detect and report any changes in its identity/address binding. For example, a software agent running on the device can detect and report changes in the mapping to the device management server associated with the device.

While the mapping of network addresses and device identities is typically determined by core network elements, the network address of a wireless device may be determined locally, such as in the case of a link-local address. A link-local address is an address determined locally by a mobile device based on the hardware MAC address. This address can be used for IP communication within a local network without having to contact a server for address assignment. The network address assigned to a mobile device can change when the mobile device moves or is reassigned. The occurrence of such an event may also trigger the sending of a mapping message from the wireless device to the device management server associated therewith.

Figure 5:
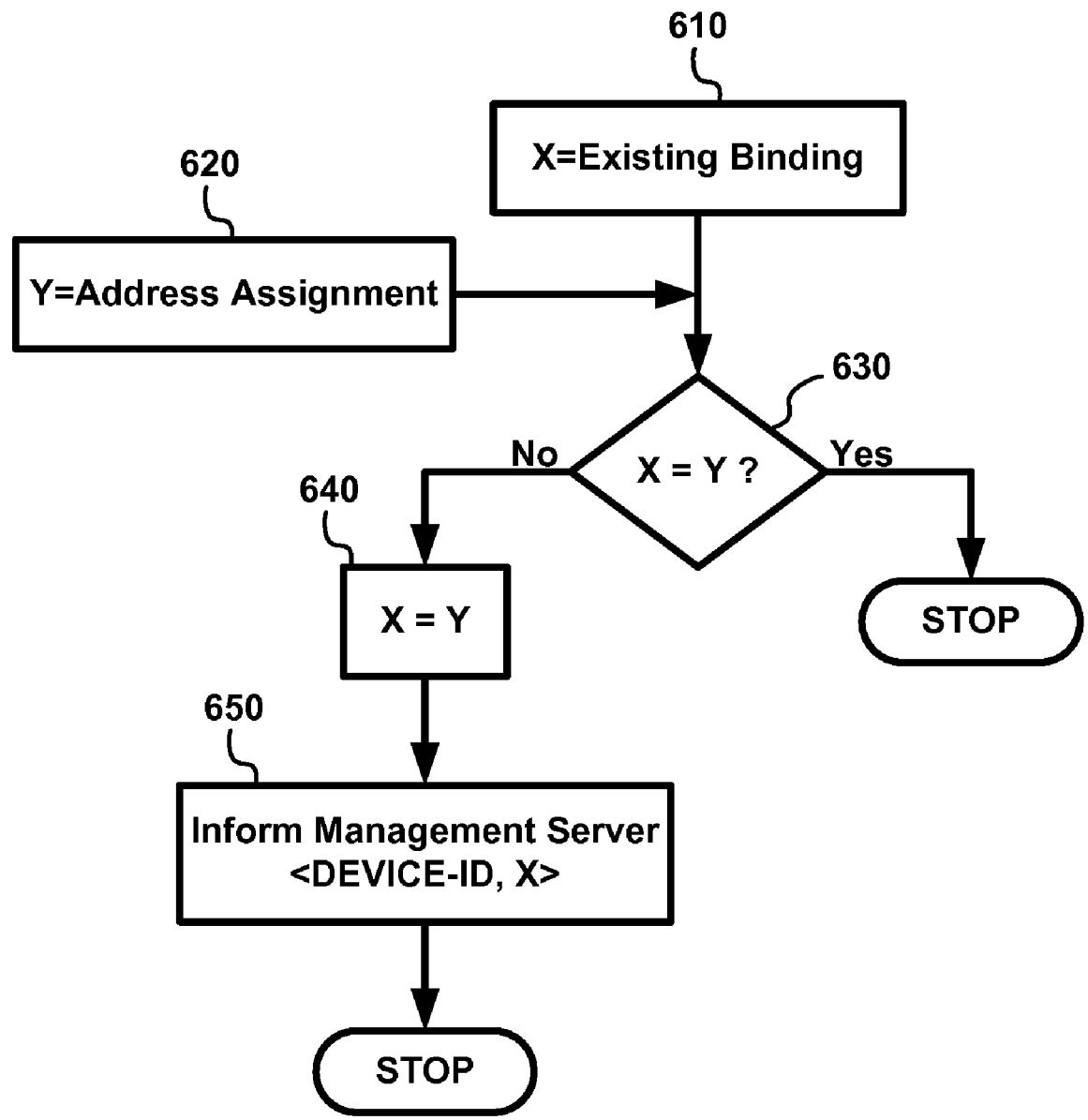
FIG. 5 shows a flow chart of a process used by a network element or a wireless device to decide whether to inform a management server of an update in the mapping between the identity and the network address of the wireless device.

FIG. 5 is a flow chart of an exemplary method that can be performed by a network or a wireless device to detect and report changes in the binding of a wireless device. 610 represents the existing binding of a wireless device. Upon assigning an address to the wireless device at 620, a comparison between the existing binding (X) and the new address assignment (Y) is carried out at 630. If they are the same, no further action is required, otherwise, operation proceeds to 640 in which the binding is updated with the new address assignment. Additionally, at 650, the device management server for the wireless device is informed of the new binding.

Figure 7:
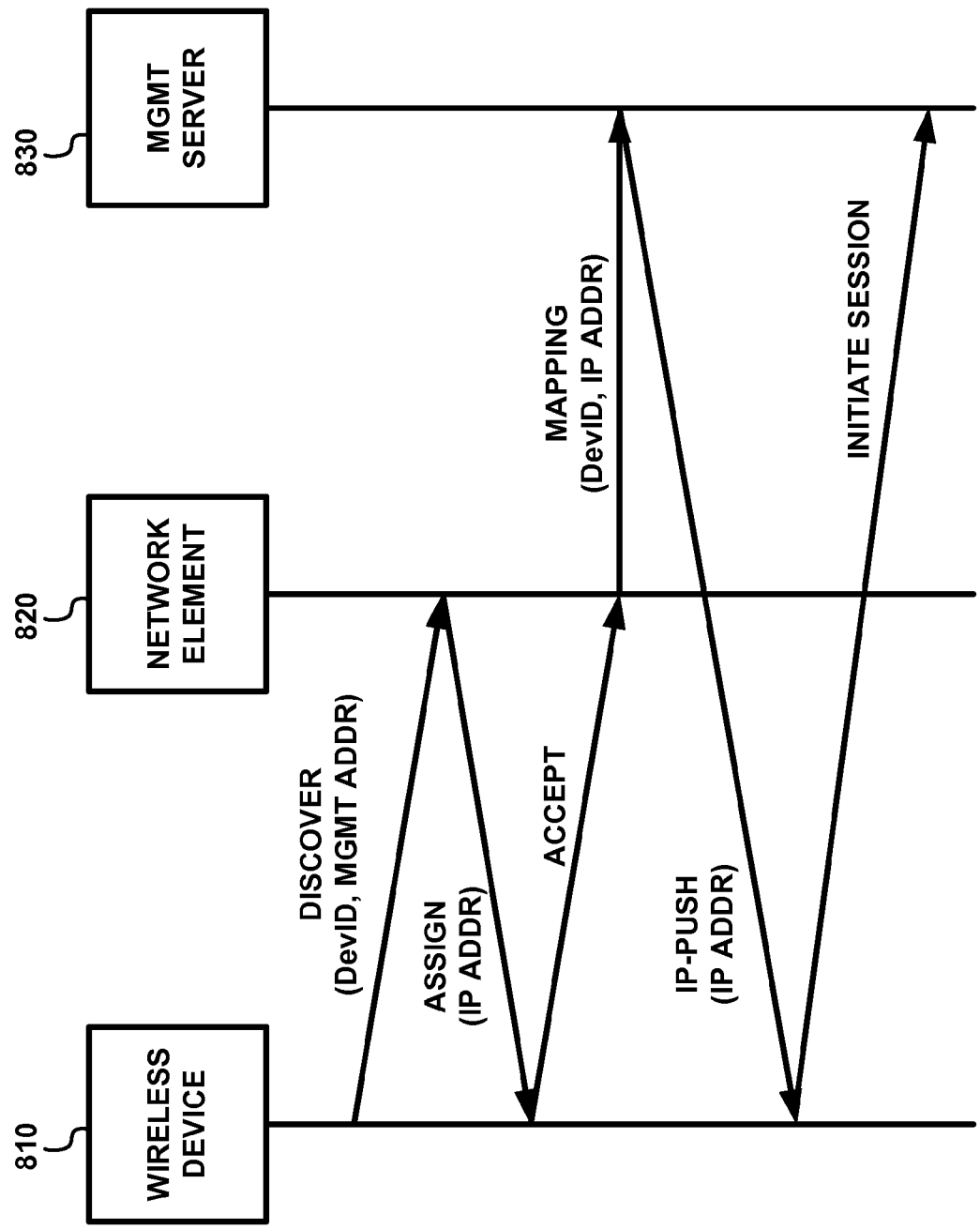
FIG. 7 shows an exemplary message flow diagram indicating the steps of providing a mapping update message to a device management server from a network element, wherein the network element learns the address of the management server and any security credentials that the device needs to connect to the management server from bootstrap information supplied by the wireless device.
Figure 8:
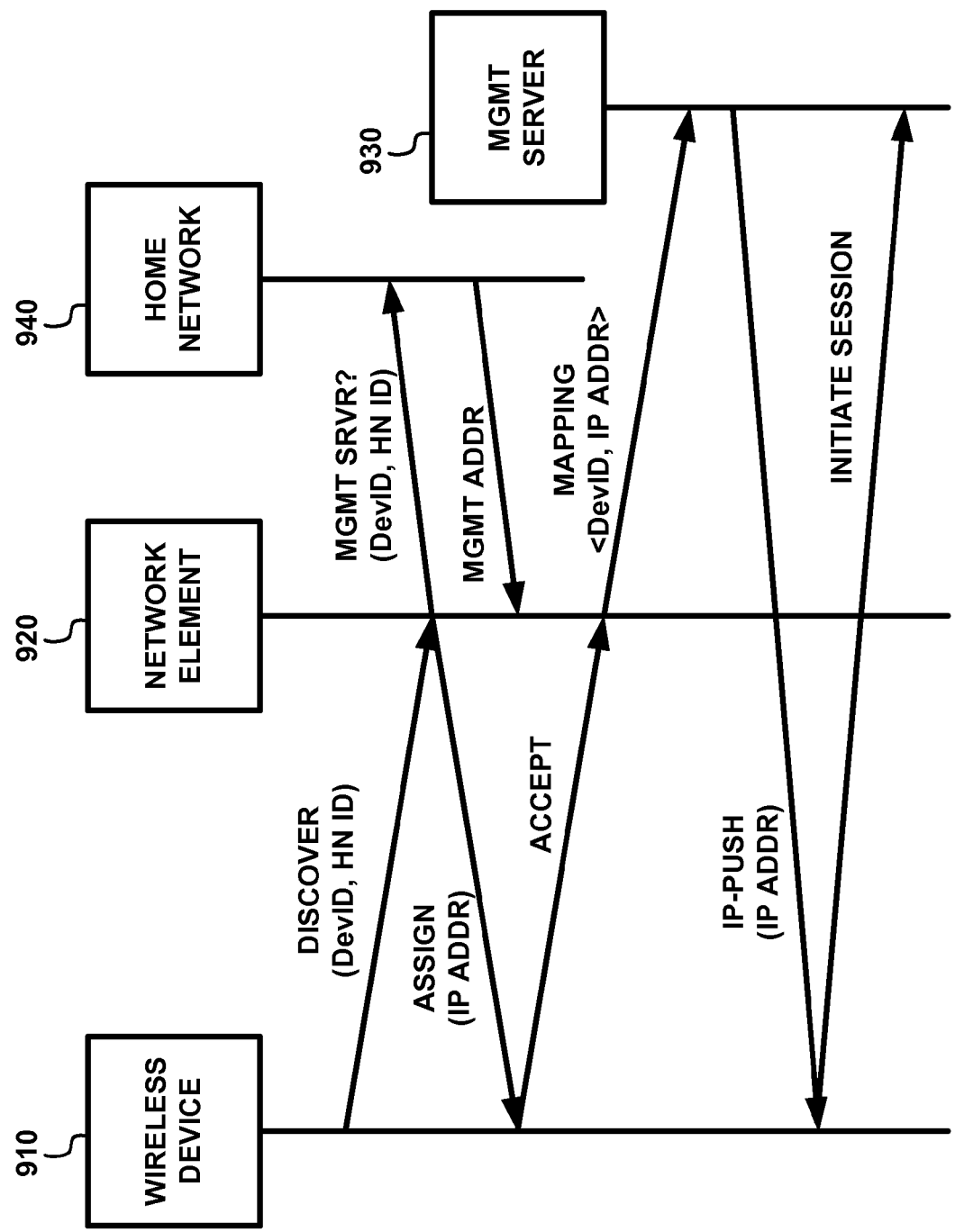
FIG. 8 shows an exemplary message flow diagram illustrating the steps of providing a mapping update message to a device management server from a network element, wherein the network element learns the network address of the management server from bootstrap information supplied by the wireless device, the bootstrap information indicating the address of an entity in the device's home network from which the address of the management server can be obtained.

In order to communicate the address mapping for a wireless device to an external device management server, the element doing so needs to know the network address of the device management server. Additionally, the element may also need to know any credentials that may be needed to establish a session with the device management server. Such credentials may include private keys, passwords or certificates expected by the device management server in order to establish a session. The network address of the device management server along with any needed credentials can be configured at the network elements (e.g., the network elements can be programmed with the information), can be obtained from the wireless device, or can be obtained from a third entity based on information from the wireless device. Exemplary methods in accordance with each of these cases are illustrated in FIGS. 6-8.

Figure 6:
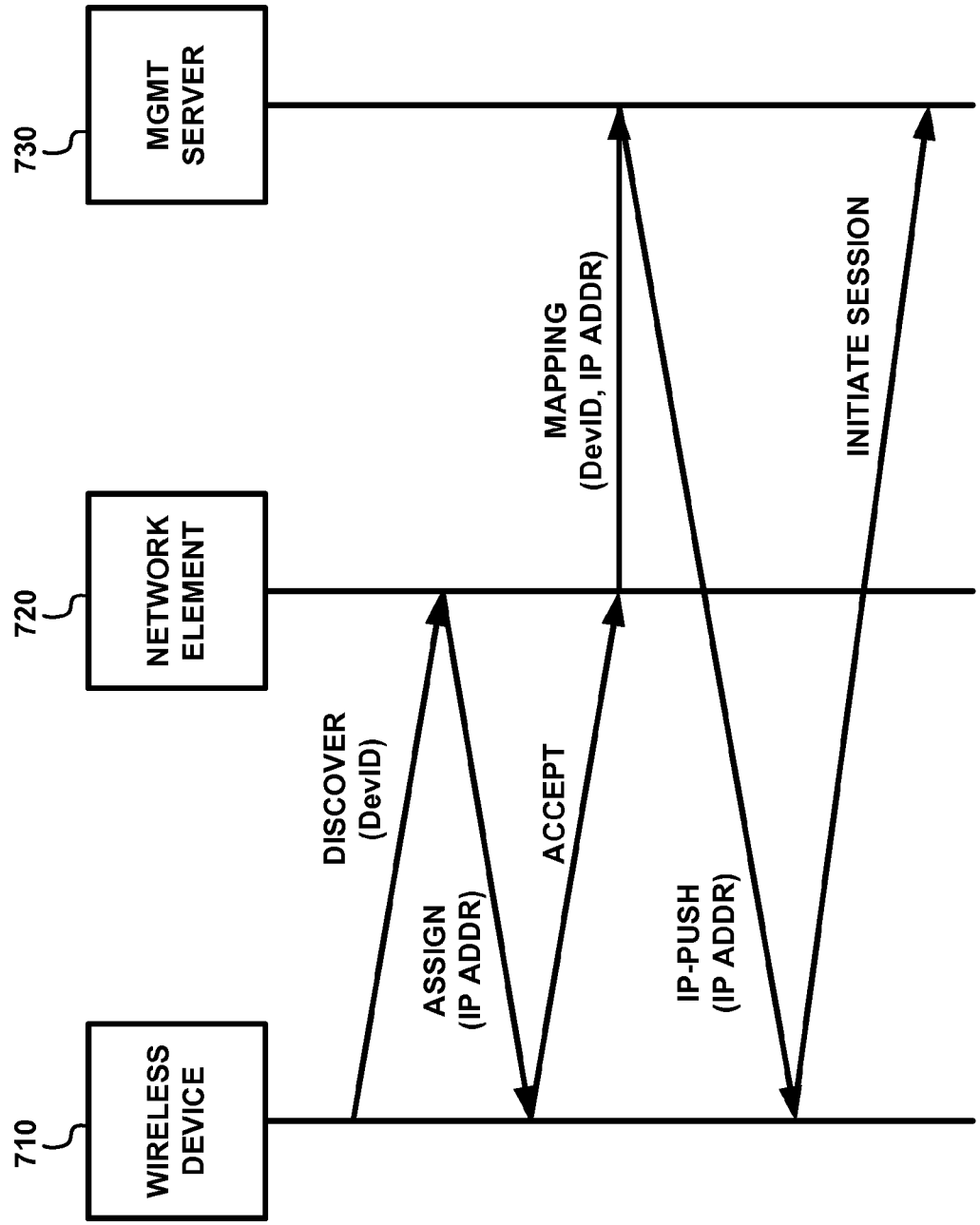
FIG. 6 shows an exemplary message flow diagram indicating the steps of generating a mapping update message from network elements that have been configured with the address of the management server.

FIG. 6 shows an exemplary message flow diagram illustrating the steps of generating a mapping update message from network elements that have been configured with the address of the management server, wherein the wireless device itself need not have the information about the management server. The present invention can be implemented using messages and message flows which follow a standard protocol, such as TCP/IP, http, https, or any suitable proprietary protocol.

As shown in FIG. 6, a wireless device 710 sends a DISCOVER message containing its identification (DevID) to the network element 720. A DISCOVER message is typically broadcast so that as many network elements as possible can reply to the initiator's DISCOVER message. The network element 720 uses the device's identification to determine the network address of the device management server associated with the device. Such a determination can be made by using, for example, a look-up table, an algorithm, or any other suitable arrangement associating the device's identification and the server network address. The network element 720 replies to the wireless device 710 with an ASSIGN message, assigning a new IP address (IP ADDR) to the wireless device 710. The wireless device 710 responds, in turn, with an ACCEPT message, indicating that it has accepted the IP address assigned to it. The network element 720 then generates and sends a MAPPING message to the device management server 730 located at the network address determined as described above. The MAPPING message contains the device identity (DevID) of the wireless device 710 as well as the newly assigned network address (IP ADDR) of the device.

Credentials for communicating with the device management server 730 may be obtained by the network element 720 such as from a look-up table, an algorithm, or other suitable arrangement, and preferably in a secure way.

Once the device management server 730 has the new IP address of the wireless device 710, the server 730 can send out an IP-PUSH message with the new IP address, to which the device 710 can respond with an INITIATE SESSION message.

FIG. 7 shows an exemplary message flow diagram illustrating the steps of providing a mapping update message to a device management server 830 from a network element 820, wherein the network element obtains the address of the device management server from bootstrap information supplied by the wireless device 810. As shown in FIG. 7, the wireless device 810 generates a DISCOVER message containing its identification (DevID) and the address of the management server (MGMT ADDR). The DISCOVER message is sent to the network element 820, which replies to the wireless device 810 with an ASSIGN message, assigning a new IP address (IP ADDR) to the wireless device 810. The wireless device 810 responds, in turn, with an ACCEPT message, indicating that it has accepted the IP address assigned to it. The network element 820 then generates and sends a MAPPING message to the device management server 830 located at the address MGMT ADDR obtained from the wireless device 810. The MAPPING message contains the device identity (DevID) of the wireless device 810 as well as the newly assigned network address (IP ADDR) of the device. Credentials for communicating with the device management server 830 can be obtained by the network element 820 from the wireless device 810 and may be contained in the DISCOVER or ACCEPT message or in another message from the wireless device 810 to the network element 820. Once the device management server 830 has the new IP address of the wireless device 810, the server 830 can send out an IP-PUSH message with the new IP address, to which the device 810 can respond with an INITIATE SESSION message.

FIG. 8 shows an exemplary message flow diagram illustrating the steps of providing a mapping update message to a device management server 930 from a network element 920, wherein the network element obtains the network address of the device management server from a third entity 940. The third entity can be an entity in the home network of the wireless device. The home network of a mobile device is the network in which the device is registered for purposes of billing and authentication. An entity in the device's home network from which the address of the management server can be obtained may include, for example, a DHCP server, a directory server, or a proxy server.

Figure 9:
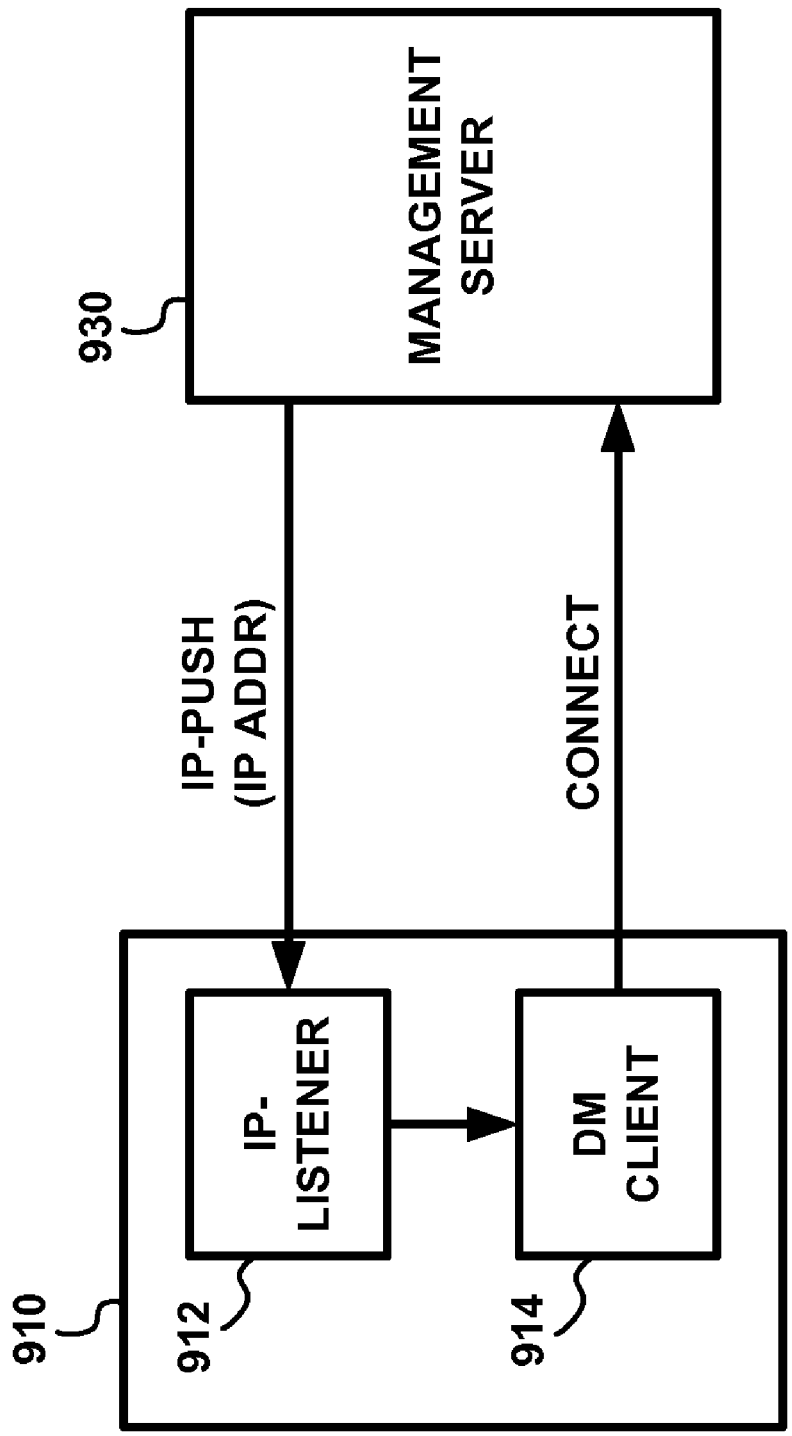
FIG. 9 depicts a management server sending a notification message to a wireless device using the network address of the wireless device and the wireless device connecting back to the management server.

In this scenario, the network element 920 learns the network address of the management server 930 using bootstrap information supplied by the wireless device 910. The bootstrap information indicates the address of the third entity 940 in the home network from which the network address of the management server can be obtained. As shown in FIG. 9, the wireless device 910 sends to the network element 920, a DISCOVER message which contains its identification (DevID) and an identification of the home network (HN ID). The network element 920 replies to the wireless device 910 with an ASSIGN message, assigning a new IP address (IP ADDR) to the wireless device 910. The wireless device 910 responds, in turn, with an ACCEPT message, indicating that it has accepted the IP address assigned to it.

At some point after it receives the DISCOVER message from the wireless device 910, the network element 920 generates and sends an inquiry (MGMT SRVR?) to the home network identified in the DISCOVER message requesting the network address of the management server associated with the wireless device 910. The home network 940 responds with network address (MGMT ADDR) of the management server 930. Note that all or part of the exchange between the network element 920 and home network 940 may occur before or after all or part of the exchange of the ASSIGN and ACCEPT messages between the network element 920 and the wireless device 910.

After receiving the ACCEPT message from the wireless device 910, the network element 920 sends a MAPPING message to the device management server 930 located at the address MGMT ADDR obtained from the home network 940. The MAPPING message contains the device identity (DevID) of the wireless device 910 as well as the newly assigned network address (IP ADDR) of the device. Credentials for communicating with the device management server 930 can be obtained by the network element 920 from the wireless device 910, as described above, or from the home network 940. Once the device management server 930 has the new IP address of the wireless device 910, the server 930 can send out an IP-PUSH message with the new IP address, to which the device 910 can respond with an INITIATE SESSION message.

In the above-described scenarios, the bootstrap information can be embedded in one or more messages in protocol option fields or as specialized extensions allowed in any of the protocol messages. Furthermore, the network address of the wireless device that is conveyed to the management server can either be the address of the device or the address of a proxy or gateway device. The later is needed when the device network address is a private address and the proxy has a public or routable address. An external system such as a device management server will need to know the public or routable address of the device which will be the proxy or gateway address. Any request from the management server will be relayed by the proxy or gateway to the device.

FIG. 9 illustrates a typical interaction between a wireless device 910 and a device management server 930, once the device management server has obtained the network address of the wireless device. The device management server 930 sends out an IP-PUSH notification message with the IP address of the intended recipient, i.e., wireless device 910, in this illustration. The recipient of the IP-PUSH notification message is any listener that can receive in-bound IP packets. An IP-listener element 912 of the device 910 listens for the IP address assigned to the device. Once the IP-listener 912 detects the IP-PUSH notification message with the wireless device's IP address, a device management (DM) client 914 of the wireless device is informed. The DM client 914 then initiates a connection to the management server.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. In a wireless communication system, a method of updating, at a device management server, a mapping between a device identity and a network address associated with a wireless device, the method comprising:
   interacting with the wireless device with a network element of the wireless communication system, wherein the step of interacting is independent of an assignment of an Internet Protocol (IP) address to the wireless device;
   determining mapping information pertaining to the wireless device as a result of the interaction, wherein the mapping information includes the device identity of the wireless device and the network address associated with the wireless device;
   sending the mapping information from the network element to the device management server, wherein an address of the device management server to which the mapping information is sent is stored in at least one of the wireless device, the network element and a further network element and wherein the address and any credentials required by the device management server are communicated to the network element using option fields or as vendor extensions in a message sent by the wireless device; and
   using the mapping information to update, at the device management server, the mapping between the device identity and the network address associated with the wireless device.

2. The method of claim 1, wherein the network address ef associated with the wireless device includes an Internet Protocol (IP) address assigned to the wireless device.

3. The method of claim 2, wherein the mapping information includes a duration for which the IP address is assigned to the wireless device.

4. The method of claim 1, wherein the network element includes at least one of a Call State Control Function (CSCF) server and a Home Subscriber Server (HSS) of an IP Multimedia Sub-system (IMS).

5. The method of claim 1, wherein the network element includes at least one of a Home Agent and a Foreign Agent deployed in an Internet Protocol (IP) network.

6. The method of claim 1, wherein the network element includes at least one of a RADIUS server, a DIAMETER server, and a AAA server in a wireless telecommunication system.

7. The method of claim 1, wherein the device identity of the wireless device includes at least one of an ESN, MEID, IMEI, SKU, BIOS string, MAC address and MSISDN of the wireless device.

8. The method of claim 1, wherein the mapping information includes a MAC address associated with a network interface by which the wireless device communicates.

9. The method of claim 8, wherein the mapping information includes a mobile binding entry time out interval.

10. The method of claim 1, wherein the step of sending the mapping information to the device management server occurs whenever the mapping between the device identity and the network address associated with the wireless device changes.

11. In a wireless communication system, a method of updating, at a device management server, a mapping between a device identity and a network address associated with a wireless device, the method comprising:
   changing a mapping between the device identity and the network address associated with the wireless device, wherein the network address associated with the wireless device includes a link-local address;
   determining, at the wireless device, mapping information pertaining to the wireless device as a result of the change in mapping, wherein the mapping information includes the device identity of the wireless device, the network address associated with the wireless device;
   sending the mapping information and any credentials required by the device management server from the wireless device to the device management server using option fields or as vendor extensions in a message, wherein an address of the device management server to which the mapping information is sent is stored in the wireless device; and
   using the mapping information to update, at the device management server, the mapping between the device identity and the network address associated with the wireless device.

12. The method of claim 11, wherein the device identity includes at least one of an ESN, MEID, SKU, IMEI, MSISDN, BIOS string, and a MAC address associated with a network interface by which the wireless device communicates.

13. The method of claim 11, wherein the updating of the mapping is triggered by at least one of an address request, an authorization request, a session request, and a provision request.

14. The method of claim 1 comprising establishing a session between the wireless device and the device management server using the mapping information.

15. The method of claim 1, wherein the step of interacting is independent of a request from the wireless device.

16. The method of claim 1, wherein the network address associated with the wireless device includes an Internet Protocol (IP) address assigned to a proxy associated with the wireless device.

17. The method of claim 11 comprising establishing a session between the wireless device and the device management server using the mapping information.

18. The method of claim 11, wherein the mapping information includes a duration for which the network address is associated with the wireless device.

* * * * *